(12) United States Patent
Hishida et al.

(10) Patent No.: US 6,799,300 B1
(45) Date of Patent: Sep. 28, 2004

(54) DOCUMENT PROCESSOR

(75) Inventors: Toshihiro Hishida, Hyogo (JP); Seiji Ura, Osaka (JP); Hidehiko Shin, Osaka (JP); Junji Ishigaki, Tokyo (JP); Keizaburo Sasaki, Kanagawa (JP); Eriko Ooseki, Kanagawa (JP)

(73) Assignees: Matsushita Electric Industrial Co., Ltd., Osaka (JP); Panasonic Mobile Communications Co., Ltd., Yokohama (JP); NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 09/646,491

(22) PCT Filed: Jan. 18, 2000

(86) PCT No.: PCT/JP00/00205

§ 371 (c)(1),
(2), (4) Date: Sep. 18, 2000

(87) PCT Pub. No.: WO00/43890

PCT Pub. Date: Jul. 27, 2000

(30) Foreign Application Priority Data

Jan. 19, 1999 (JP) .......................................... 11-010351

(51) Int. Cl.$^7$ .............................................. G06F 17/00
(52) U.S. Cl. ...................... 715/513; 715/514; 715/526; 715/501.1
(58) Field of Search .............................. 715/513, 501.1, 715/514, 526

(56) References Cited

U.S. PATENT DOCUMENTS 5,812,776 A * 9/1998 Gifford ........................ 709/217
5,850,433 A * 12/1998 Rondeau ................. 379/218.01
5,946,647 A * 8/1999 Miller et al. .................... 704/9
6,173,316 B1 * 1/2001 De Boor et al. ............ 709/218
6,266,539 B1 * 7/2001 Pardo ....................... 455/556.2
6,298,357 B1 * 10/2001 Wexler et al. .............. 715/513
6,338,085 B1 * 1/2002 Ramaswamy ............... 709/217

FOREIGN PATENT DOCUMENTS

| JP | 10-155038 | 6/1998 |
| JP | 10-164256 | 6/1998 |
| JP | 10-177529 | 6/1998 |
| JP | 10-247988 | 9/1998 |
| JP | 10-301869 | 11/1998 |
| JP | 10-336346 | 12/1998 |
| JP | 10-336349 | 12/1998 |

* cited by examiner

Primary Examiner—Joseph Feild
Assistant Examiner—Nathan Hillery
(74) Attorney, Agent, or Firm—Pearne & Gordon LLP

(57) ABSTRACT

A document processing apparatus that automatically carries out a transmission operation at the time of a link selection, which selects a telephone number described in the link information without carrying out a useless operation. The link information is the additional information which is not actually displayed, like as the HTML. The document processing apparatus includes a receiver for receiving the document; a link information extractor for extracting the link information from the document a display for displaying the document based on the link information extracted by the link information extractor; a selector for selecting the link information in the document; and a link operator controller for carrying out the transmission operation to another party, when the link information selected by the selector is the telephone number information.

5 Claims, 11 Drawing Sheets

```
<HTML>
                    202                    201
        <A href="http://www.aaa.bbb.com"> LINK TO ○○ </A><BR>

<A href="tel:012345678"> THIS IS TELEPHONE NUMBER </A>
</HTML>          204                              203
```

LINK TO ○○

THIS IS TELEPHONE NUMBER

FIG. 11

| KINDS | START POSITION | END POSITION | EFFECTIVE OR INEFFECTIVE | |
|---|---|---|---|---|
| HYPER LINK | 21 | 44 | EFFECTIVE | 1101 |
| ELECTRONIC MAIL | 71 | 88 | EFFECTIVE | 1102 |
| TELEPHONE NUMBER | 32 | 40 | EFFECTIVE | 1103 |
| TELEPHONE NUMBER | 73 | 80 | EFFECTIVE | 1104 |
| TELEPHONE NUMBER | 117 | 126 | EFFECTIVE | 1105 |

| KINDS | START POSITION | END POSITION | EFFECTIVE OR INEFFECTIVE |
|---|---|---|---|
| HYPER LINK | 21 | 44 | EFFECTIVE |
| ELECTRONIC MAIL | 71 | 88 | EFFECTIVE |
| TELEPHONE NUMBER | 32 | 40 | INEFFECTIVE ~1301 |
| TELEPHONE NUMBER | 73 | 80 | INEFFECTIVE ~1302 |
| TELEPHONE NUMBER | 117 | 126 | EFFECTIVE |

LINK TO ○○ IS TO http://aaa/012345678.html — 1401

ADDRESS OF ELECTRONIC MAIL IS TO ab00000012@aaa.com — 1402

TELEPHONE INQUIRY IS TO 0010001234 — 1403

DOCUMENT PROCESSOR

TECHNICAL FIELD

The present invention relates to a document display apparatus by which a document is received and display processed. Specifically, the present invention is structured in such a manner that, by automatically conducting a transmission operation at the time of a link selection, a useless operation is omitted.

BACKGROUND ART

Recently, according to the spread of the internet, an exchange of a document using a descriptive language such as HTML (Hypertext Markup Language) is conducted, and an operation such as display is carried out by using a software to carry out the document processing which is called a Web browser.

In the document described by the HTML, the information which is called link, can be included, and the additional information such as the link (hypertext link) among a plurality of documents described by the HTML, or the link with the electronic mail function, can be described in the document. When there is a means for selecting this link, the operation corresponding to the kind of the link information can be carried out. Recently, the Web browser is installed also in a personal portable terminal equipment including the communication function built-in PDA (Personal Digital Assistant), and an access to the internet can be made by using the personal portable terminal equipment independent of wired or wireless communication, and the internet access is frequently carried out in the wide uses including the electronic mail exchange. Presently, the HTML is standardized by the W3C (World Wide Web Consortium), and at present, the standardization of the HTML Ver. 4.0 is completed.

Details of the HTML is disclosed in [http://www.w3c.org/].

Further, the technology by which the telephone number included in the electronic mail is extracted, and registration into the telephone directory and transmission process are easily realized, is disclosed in Japanese Patent Publication No. 10-155038. This technology is as follows: when transmission operation is carried out, the telephone number figure train included in the electronic mail is automatically extracted, and when only one candidate of the telephone number exists, the transmission processing is automatically carried out, and further, when a plurality of telephone numbers are extracted, the candidate list is displayed, and by the selection of the telephone number by the user, the transmission processing can be carried out.

However, when the link information can be described as the additional information which is not actually displayed as the HTML, even when the telephone number is described in the link information described as the additional information, because there is no means for judging whether the link information is the telephone number, the transition operation can not be automatically carried out at the time of the link selection. Accordingly, even when the user wants to call to corresponding the other party when the document described by the HTML is displayed, it is necessary that the user presses the telephone number and carries out the transmission operation at every time, and it is very inconvenient.

Further, in the case of the ordinary text document in which the link information can not be described as the additional information which is not actually displayed, when the technology disclosed in Japanese Patent Publication No. 10-155038 is used to the document in which a plurality of different link information is described, there is a possibility that, although a figure train should not be extracted as the telephone number, it is extracted as the candidate for the telephone number. Accordingly, there is a possibility that the transmission is carried out to the unintended telephone number, and there is a problem that a time necessary for confirming every time whether the transmission operation may be carried out, is increased for the user.

For example, in the case of the document of [electronic mail address: ab012345678@com], when the transmission operation is carried out, because only [012345678] is extracted as the telephone number, there is a problem that, although it is not originally the other party of the telephone number, the transmission operation is automatically carried out. Further, for example, in the case of the document of [electronic mail address: ab012345678@com telephone number: 3455678], when the transmission operation is carried out, because [012345678] and [3455678] are extracted as the telephone numbers, respectively to each of a plurality of extracted telephone numbers, it is necessary for the user to confirm whether it is originally the other party of the telephone number, and therefore, there is a problem that a time necessary for confirming every time is increased for the user.

The present invention is to solve such the conventional problems, and an object of the present invention is to provide a document processing apparatus in which, in the case where the link information can be described as the additional information which is not actually displayed as the HTML and the telephone number is described in the link information described as the additional information, by automatically carrying out the transmission operation at the time of the link selection, the useless operation is not carried out, and the facility is increased for the user.

Another object of the present invention is to provide a document processing apparatus in which, in the case where the telephone number information and the link information other than the telephone number information are mixedly described in the document, by making the telephone number information and the link information other than the telephone number information, not being extracted in duplication, the misconception at the time of extraction is eliminated, and a time necessary for confirming every time whether it is right for the telephone number, is decreased for the user.

DISCLOSURE OF THE INVENTION

In order to solve the above problems, a document processing apparatus of the present invention is characterized in that it comprises: a receiving means for receiving a document; a link information extraction means for extracting the link information from the received document by the receiving means; a display means for displaying the document based on the link information extracted by the link information extraction means; a selection means for selecting the link information in the document; and a link operation control means for conducting the transmission operation to the other party shown by the telephone number information, when the link information selected by the selection means is the telephone number information.

Further, in order to solve the above problems, a document processing apparatus according to the present invention is characterized in that it comprises: a receiving means for receiving a document in which the telephone number information and at least one link information different from the telephone number information, are included in the document content; and a link information extraction means for extracting the telephone number information and the link information different from the telephone number information from the document received by the receiving means, wherein the link information extraction means extracts the telephone number information and the link information different from the telephone number information in the order of a predetermined priority.

Further, in order to solve the above problems, a document processing apparatus according to the present invention is characterized in that it comprises: a receiving means for receiving a document in which the telephone number information and at least one link information different from the telephone number information, are included in the document content; and a link information extraction means for extracting the telephone number information and the link information different from the telephone number information from the document received by the receiving means; and a link information determination means for determining any one of duplicating information as the link information according to a predetermined priority, when both of information extract the same character row in the document as the candidate.

Further, in order to solve the above problems, a document processing apparatus according to the present invention is characterized in that it comprises: a receiving means for receiving a document in which the telephone number information and at least one link information different from the telephone number information, are included in the document content; and a link information extraction means for extracting the telephone number information and the link information different from the telephone number information from the document received by the receiving means; wherein the link information extraction means carries out the extraction processing in a predetermined priority so that the extraction results of the most suitable telephone number information and the most suitable link information different from the telephone number information are not duplicated.

Furthermore, the document processing apparatus may be further provided with: a display means for displaying the document based on the link information extracted by the link information extraction means; a selection means for selecting the link information in the document; and a link operation control means for conducts transmission operation to the other party shown by the telephone number information, when the link information selected by the selection means is the telephone number information.

BRIEF DESCRIPTION OF THE DRAWINGS

FIG. 11 is a conceptual view of the link information stored in the second storage means in the second embodiment of the present invention.

BEST MODE FOR CARRYING OUT THE INVENTION

First Embodiment

Figure 1:
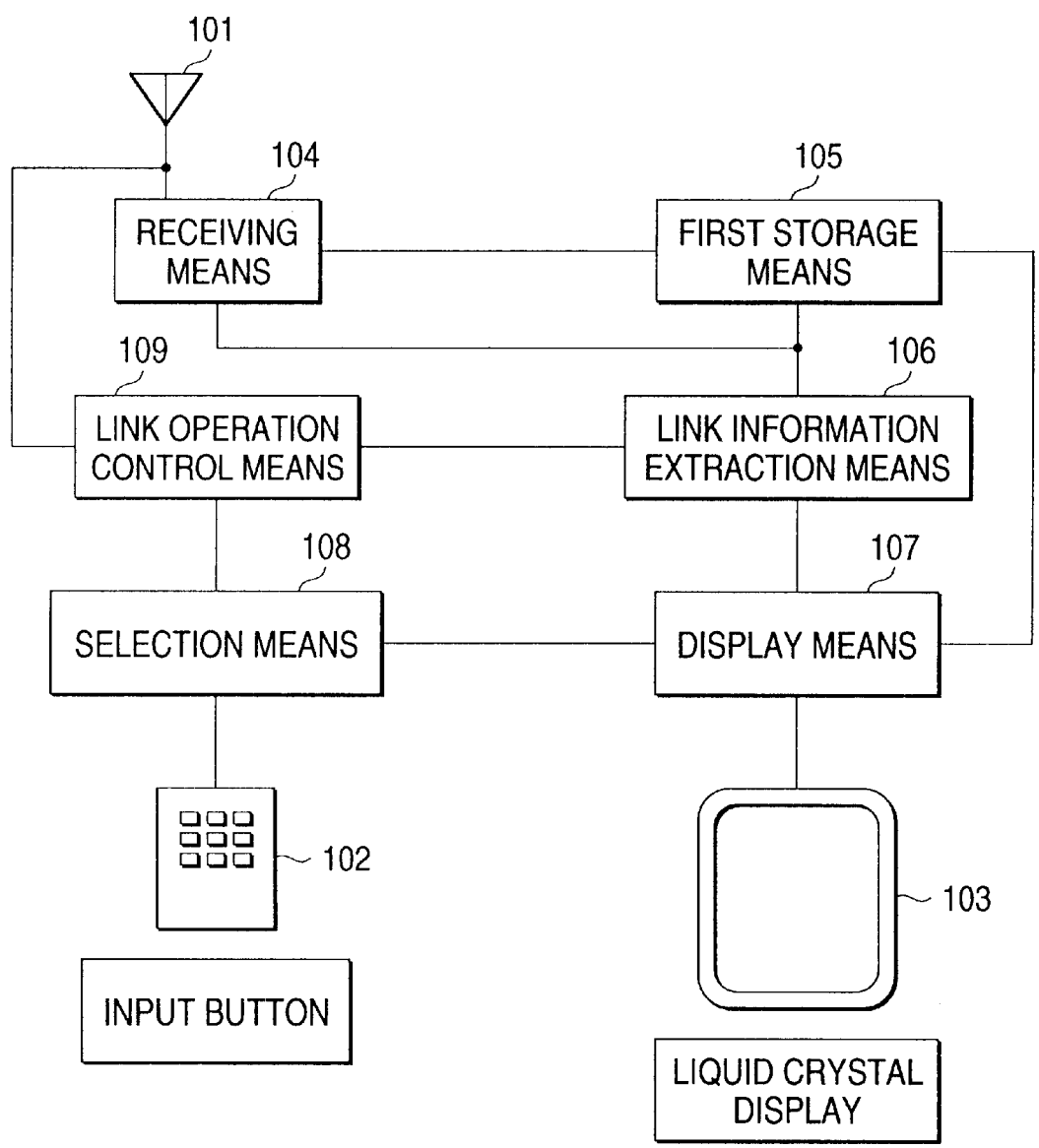
FIG. 1 is a block diagram showing the structure of a document processing apparatus of the first embodiment of the present invention.

Referring to the drawings, the first embodiment of the present invention will be described below. FIG. 1 is a block diagram showing the document processing apparatus of the first embodiment of the present invention.

In FIG. 1, the document processing apparatus is structured by a receiving antenna 101, input button 102, liquid crystal display 103, receiving means 104, the first storage means 105, link information extraction means 106, display means 107, selection means 108, and link operation control means 109.

Figures 2, 3:
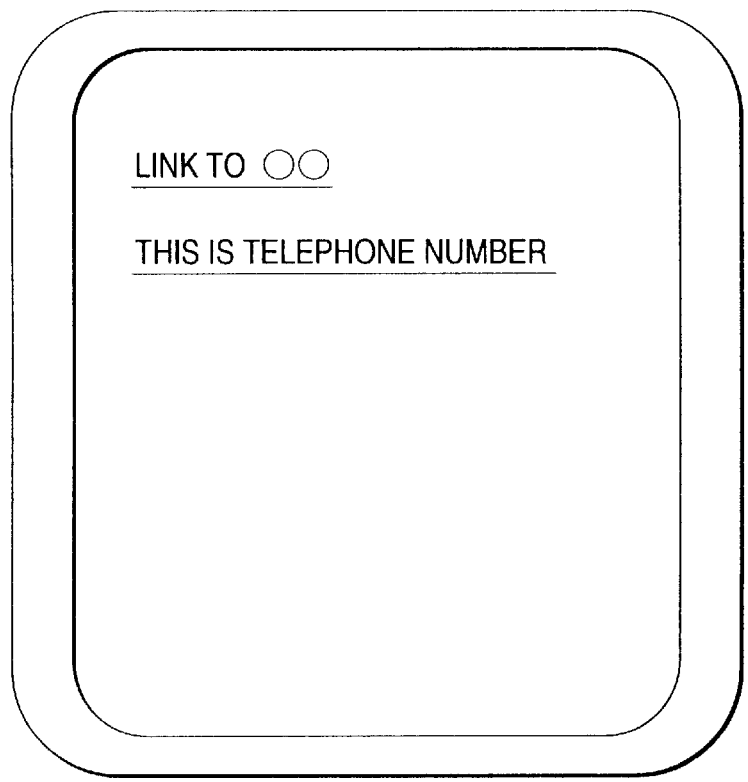
FIG. 2 is an example of a document received in the first embodiment of the present invention.
FIG. 3 is an example of a display in the first embodiment of the present invention.

The receiving means 104 receives the document described by the HTML language as shown in FIG. 2, from the receiving antenna 101.

In FIG. 2, line 201 and line 203 are showing that the link information is included. In the HTML, by surrounding by [<A>] and [</A>], it can be described that the link information is included in the surrounded area. The area 202, and the area 204 are respectively show the- link destination information of the link information included in the line 201, and the line 203. The link destination information beginning from the character row [http://] is the hyper link to the other document, and the link destination information beginning from the character row [tel:] shows the telephone number.

The first storage means 105 stores the receiving data received by the receiving means 104.

The link information extraction means 106 extracts the link information from the receiving data stored in the first storage means 105.

The display means 107 generates the display data from the link information extracted by the link information extraction means 106, and the receiving data stored in the first storage means 105, and outputs to the liquid crystal display 103. When the display data is generated, the under line is provided to the area including the link information, and the display data which can be distinguished from the area in which the link information is not included, is generated. An example of the display when the HTML document shown in FIG. 2 is displayed, is shown in FIG. 3.

The selection means 108 selects the area including the link information displayed on the liquid crystal display 103 by the operation of the input button 102.

The link operation control means 109 extracts the link destination information from the area including the link information selected by the selection means 108 and the link information extracted by the link information extraction means 106, and when the link destination information is the telephone number, the transmission operation is carried out, and when it is the hyper link, the document obtaining processing is carried out.

Figure 4:
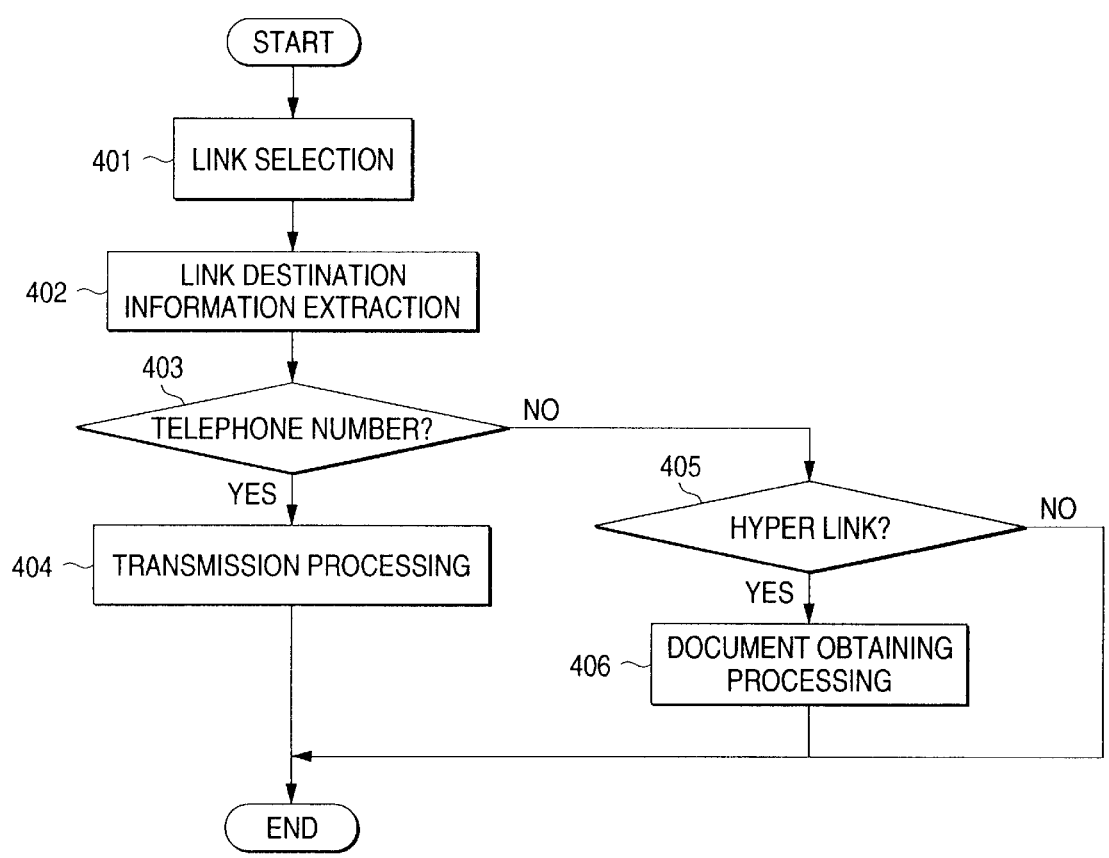
FIG. 4 is an operation flow chart of a link operation control means in the first embodiment of the present invention.

Next, by using the flow chart in FIG. 4, the operation when the area including the link information is selected in the document processing apparatus in the present embodiment, will be described.

Step 401: the selection means 108 selects the area including the link information displayed on the liquid crystal display 103 by the operation of the input button 102, and advances to step 402.

Step 402: the link operation control means 109 extracts the link destination information selected from the area including the link information selected in Step 401, and the link information extracted by the link information extraction means 106, and advances to Step 403.

Step 403: it is judged whether the link destination information is the telephone number. When it is the telephone number, the sequence advances to Step 404, and when it is not the telephone number, the sequence advances to Step 405.

Step 404: the transmitting operation is carried out by using the telephone number included in the link destination information, and this step ends.

Step 405: it is judged whether the link destination information is the hyper link. When it is the hyper link, the sequence advances to Step 406, and when it is not the hyper link, this step ends.

Step 406: the document obtaining processing is carried out by using the hyper link information included in the link destination information, and this step ends.

Next, the specific operation when the area including the link information is selected in the document processing apparatus of the present embodiment, will be described. It is defined that operations advance in the following order from (1) to (4). Incidentally, the HTML document shown in FIG. 2 is displayed as shown in FIG. 3, and the area displayed as [the telephone number is this], is selected. Because descriptions relating to FIG. 2 and FIG. 3 are as described above, descriptions are neglected.

(1) The selection means 108 selects [the telephone number is this] displayed on the liquid crystal display 103 by the operation of the input button 102.

(2) The link operation control means 109 extracts [tel: 012345678] as the link destination information from the matter that [the telephone number is this] is selected, and the link information extracted by the link information extraction means 106.

(3) The link operation control means 109 judges whether the link destination information is the telephone number. The judgement whether it is the telephone number or not, is carried out according to whether it is the character row beginning from [tel:]. As the result, it is judged to be the telephone number.

(4) The link operation control means 109 caries out the transmitting operation by using [012345678] which is the telephone number included in the link destination information [tel: 012345678].

As described above, according to the present embodiment, in the case where the link information can be described as the additional information which is actually not displayed like as the HTML, when the telephone number is described in the link information described as the additional information, the transmitting operation can be automatically carried out at the time of the link selection, and the facility can be increased for the user, without carrying out the useless operation.

Incidentally, in the present embodiment, an example in which the HTML is used as the receiving document, is shown, however, the document may be described by another language in which the link information is described as an additional information which is not actually displayed.

Further, in the present embodiment, the judgement whether it is the telephone number or not, is carried out according to whether it is the character row beginning from [tel:] or not, however, when the character row which is not duplicated with the other link destination information is previously determined, any character row may be used.

The Second Embodiment

Figure 5:
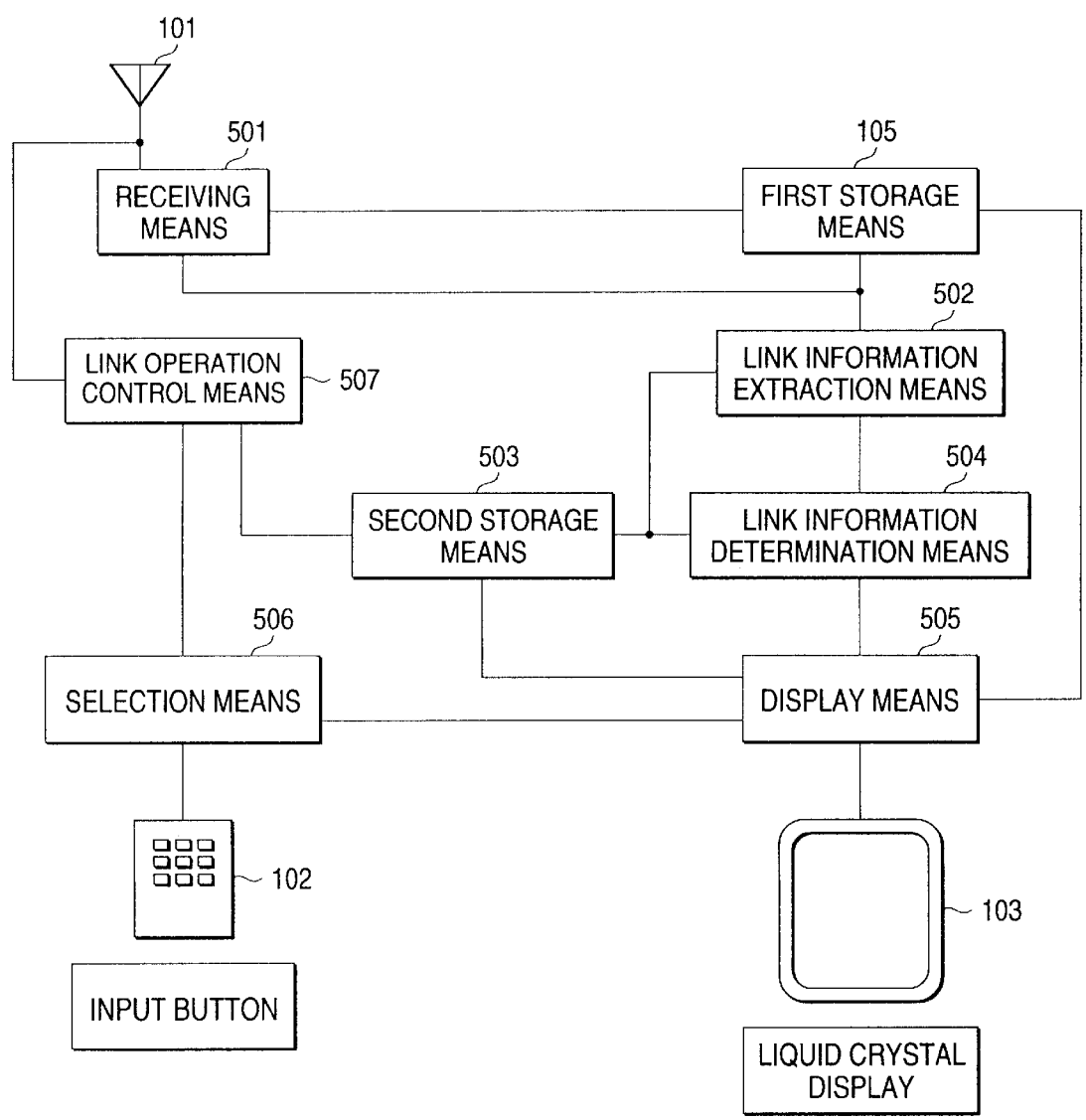
FIG. 5 is a block diagram showing the structure of a document processing apparatus of the second embodiment of the present invention.

Referring to the drawings, the second embodiment of the present invention will be described below. FIG. 5 is a block diagram showing the document processing apparatus of the second embodiment of the present invention. In FIG. 5, the document processing apparatus is structured by a receiving antenna 101, input button 102, liquid crystal display 103, receiving means 501, the first storage means 105, link information extraction means 502, the second storage means 503, link information determination means 504, display means 505, selection means 506, and link operation control means 507. The receiving antenna 101, input button 102, liquid crystal display 103, and the first storage means 105, are as shown in the first embodiment.

Figure 6:
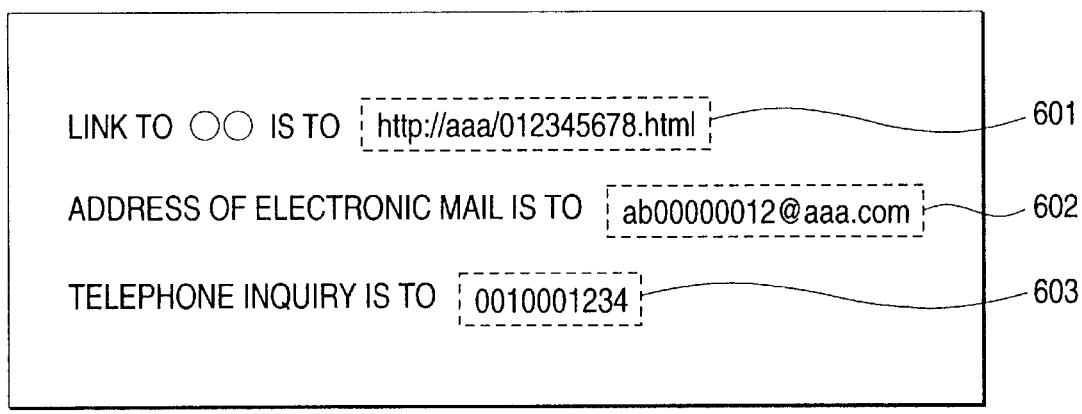
FIG. 6 is an example of the document received in the second embodiment of the present invention.

The receiving means 501 receives the normal text document as shown in FIG. 6 from the receiving antenna.

In FIG. 6, the area 601, area 602, and area 603 show the link information. The character row beginning from the character row [http://], reaching to the line feed, space or em character, is the link information showing the hyper link to another document. Further, as shown in the area 602, the character row structured by the alphanumeric coded characters before and after [@] is the link information showing the electronic mail address. Further, as shown in the area 603, the character row structured by the figures from 0 to 9 or the characters [#], [*], [-], [.], [(], [)] is the link information showing the telephone number.

The link information extraction means 502 extracts the link information from the receiving data stored in the first storage means 105, and stores the result in the second storage means 503, which will be described later.

The second storage means 503 stores the result information of the link information extraction means 502 and the link information determination means 503, which will be described later, in a conceptual format as shown in FIG. 11.

The stored information is the kind of the link information, the starting position of the link information to the whole document, the end position of the link information to the whole document, and the effective or ineffective information of the link information.

In FIG. 11, the line 1101 shows that: the kind of the link information is the hyper link, the starting position is the 21-th bytes of the whole document, the end position is the 44-th bytes of the whole document, and the link information is effective. The line 1102 shows that: the kind of the link information is the electronic mail, the staring position is the 71-th bytes of the whole document, the end position is the 88-th bytes of the whole document, and the link information is effective. The line 1103 shows that: the kind of the link information is the telephone number, the staring position is the 32-th bytes of the whole document, the end position is the 40-th bytes of the whole document, and the link information is effective. The line 1104 shows that: the kind of the link information is the telephone number, the staring position is the 73-th bytes of the whole document, the end position is the 80-th bytes of the whole document, and the link information is effective. The line 1105 shows that: the kind of the link information is the telephone number, the staring position is the 117-th bytes of the whole document, the end position is the 126-th bytes of the whole document, and the link information is effective.

The link information determination means 504 determines the link information based on the result of the link information extraction means 502 according to the predetermined priority, and stores the result in the second storage means 503.

The display means 505 generates the display data from the link information stored in the second storage means 503, and the received document stored in the first storage means, and outputs to the liquid crystal display 103. When the display data is generated, the under line is provided in the area including the link information, and the display data by which the area not including the link information can be distinguished, is generated.

The selection means 506 selects the area including the link information displayed on the liquid crystal display 103.

The link operation control means 507 extracts the link destination information from the area including the link information selected by the selection means 506, and the link information stored in the second storage means 503, and when the link destination information is the telephone number, the link operation control means 507 carries out the transmission operation, and when it is the hyper link, the link operation control means 507 carries out the document obtaining processing.

Figure 7:
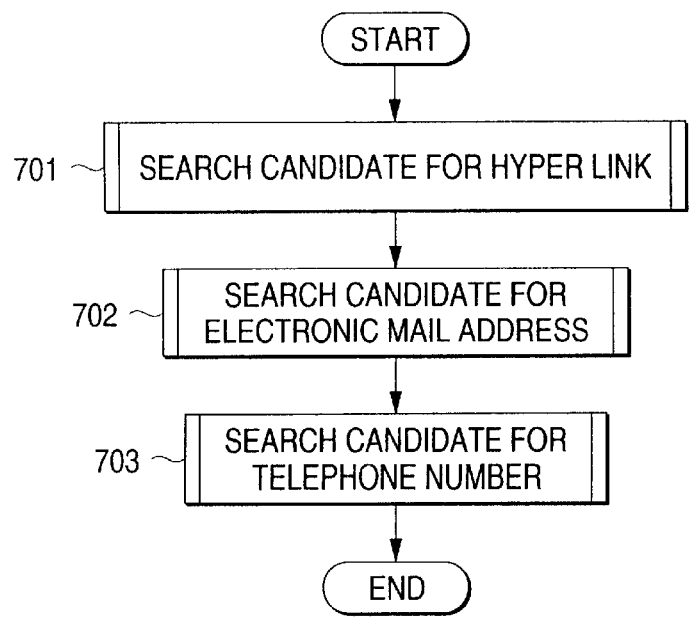
FIG. 7 is an operation flow chart at the time of the link information extraction in the second embodiment of the present invention.

Next, by using a flow chart in FIG. 7, the operation when the link information extraction means 502 extracts the link information in the document processing apparatus in the present embodiment, will be described.

Step 701: candidate for hyper link is searched to the whole document stored in the first storage means 105. The result of the search is stored in the second storage means 503, and the sequence advances to Step 702.

Step 702: candidate for electronic mail address is searched to the whole document stored in the first storage means 105. The result of the search is stored in the second storage means 503, and the sequence advances to Step 703.

Step 703: candidate for telephone number is searched to the whole document stored in the first storage means 105. The result of the search is stored in the second storage means 503, and the sequence ends.

Figure 8:
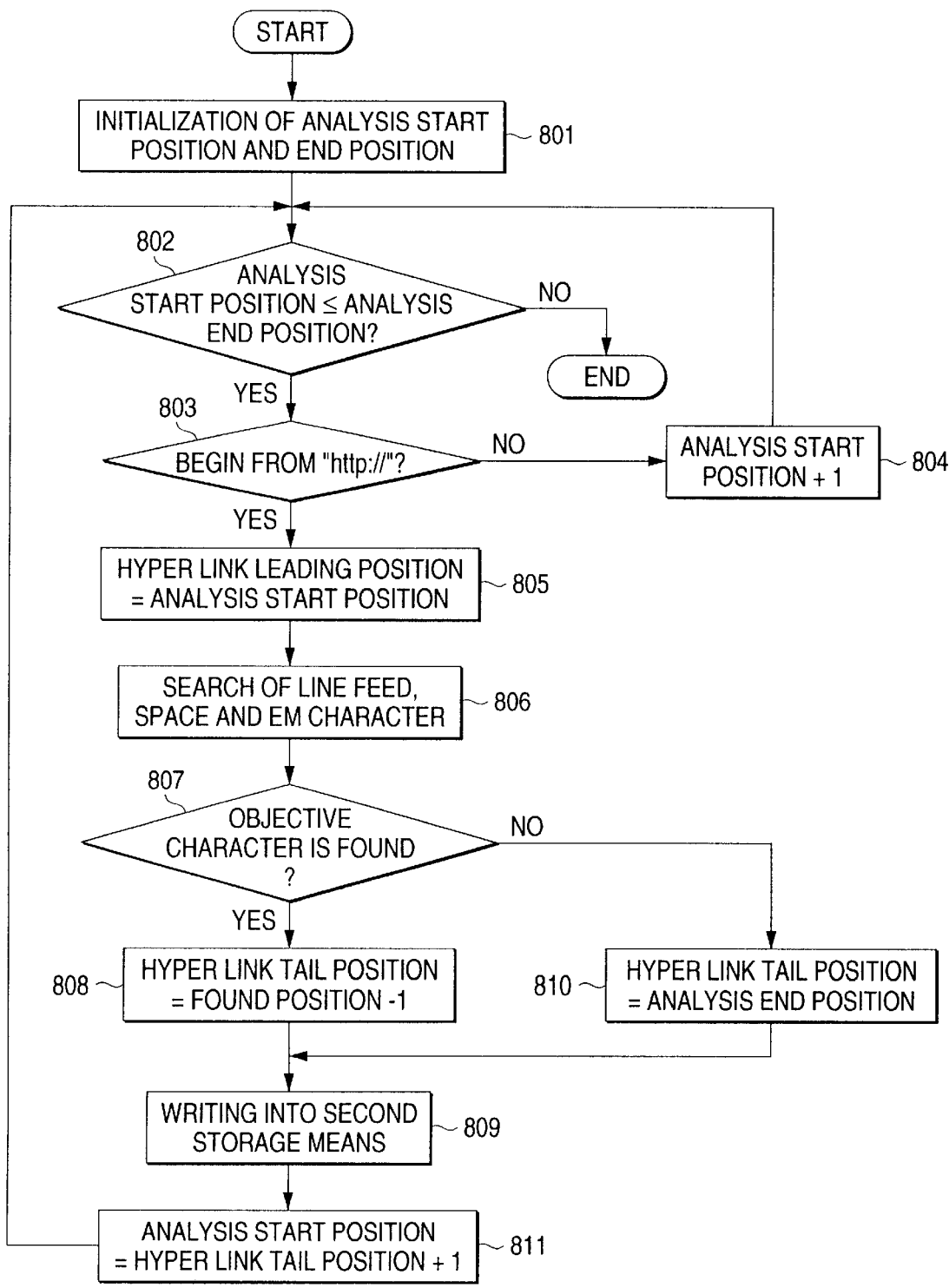
FIG. 8 is an operation flow chart at the time of the most suitable hyper link search in the second embodiment of the present invention.

Next, by using a flowchart in FIG. 8, the search operation of the most suitable hyper link in Step 701 will be described.

Step 801: the analysis start position and the analysis end position used for carrying out the analysis, are initialized, and the sequence advances to Step 802.

Step 802: when the analysis start position is equal or smaller than the analysis end position, the sequence advances to Step 803, and when it is not so, the sequence ends.

Step 803: when the character row from the analysis start position begins from "http://", the sequence advances to Step 805, and when it is not so, the sequence advances to Step 804.

Step 804: the analysis start position is added by 1, and the sequence advances to Step 802.

Step 805: the leading position of the hyper link is made the analysis start position, and the sequence advances to Step 806.

Step 806: it is searched whether the line feed, space, or em character appears next, between a range from the analysis start position to the analysis end position, and the sequence advances to Step 807.

Step 807: when the search objective character is found, the sequence advances to Step 808, and when it is not found, the sequence advances to Step 810.

Step 808: the tail position of the hyper link is made to be a one position before the find position, and the sequence advances to Step 809.

Step 809: the hyper text as the kind, the hyper link leading position as the start position, the hyper link tail position as the end position, and the information that it is effective, are stored in the second storage means 503, and the sequence advances to Step 812.

Step 810: the hyper link tail position is made the analysis end position, and the sequence advances to Step 809.

Step 811: the analysis start position is renewed to the next position to the hyper link tail position, and the sequence advances to Step 802.

Figure 9:
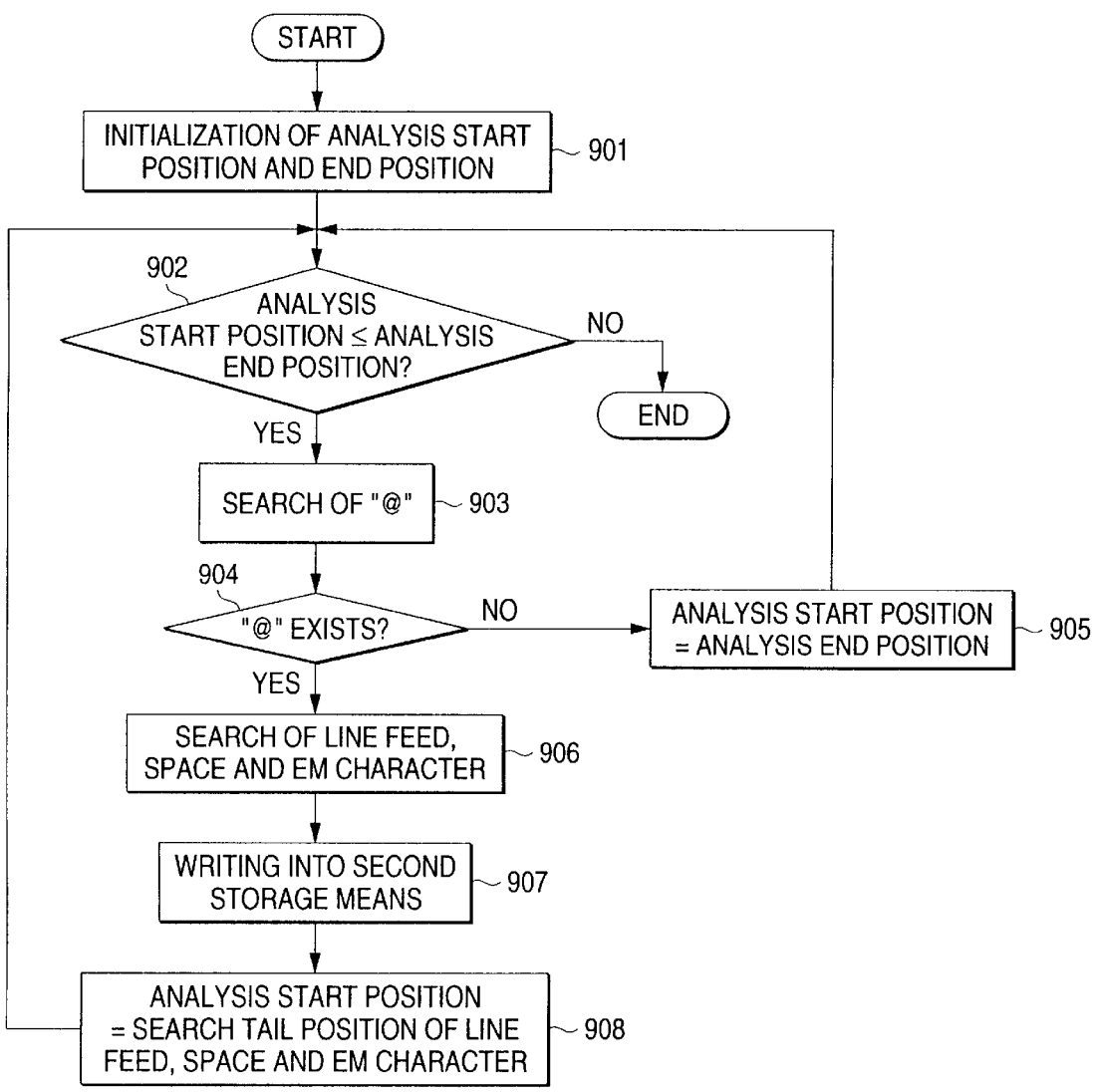
FIG. 9 is an operation flow chart at the time of the most suitable electronic mail address search in the second embodiment of the present invention.

Next, by using a flowchart in FIG. 9, the search operation of the most suitable electronic mail address in Step 702 will be described.

Step 901: the analysis start position and the analysis end position used for carrying out the analysis, are initialized, and the sequence advances to Step 902.

Step 902: when the analysis start position is equal or smaller than the analysis end position, the sequence advances to Step 903, and when it is not so, the sequence ends.

Step 903: it is searched whether the character "@" exists between a range from the analysis start position to the analysis end position, and the sequence advances to Step 904.

Step 904: when the character "@" is found, the sequence advances to Step 906, and when it is not found, the sequence advances to Step 905.

Step 905: the analysis start position is made the analysis end position, and the sequence advances to Step 902.

Step 906: before and after the position at which the character "@" is found, a position at which the line feed, space, em character are found at first, is respectively searched, and the leading position and tail position of the electronic mail address are searched, and the sequence advances to Step 907.

Step 907: the electronic mail address as the kind, the leading position, which is searched in Step 906, +1 as the start position, the tail position, which is searched in Step 906, −1 as the end position, and the information that it is effective, are stored in the second storage means 503, and the sequence advances to Step 908.

Step 908: the analysis start position is made the tail position extracted in Step 906, and the sequence advances to Step 902.

Figure 10:
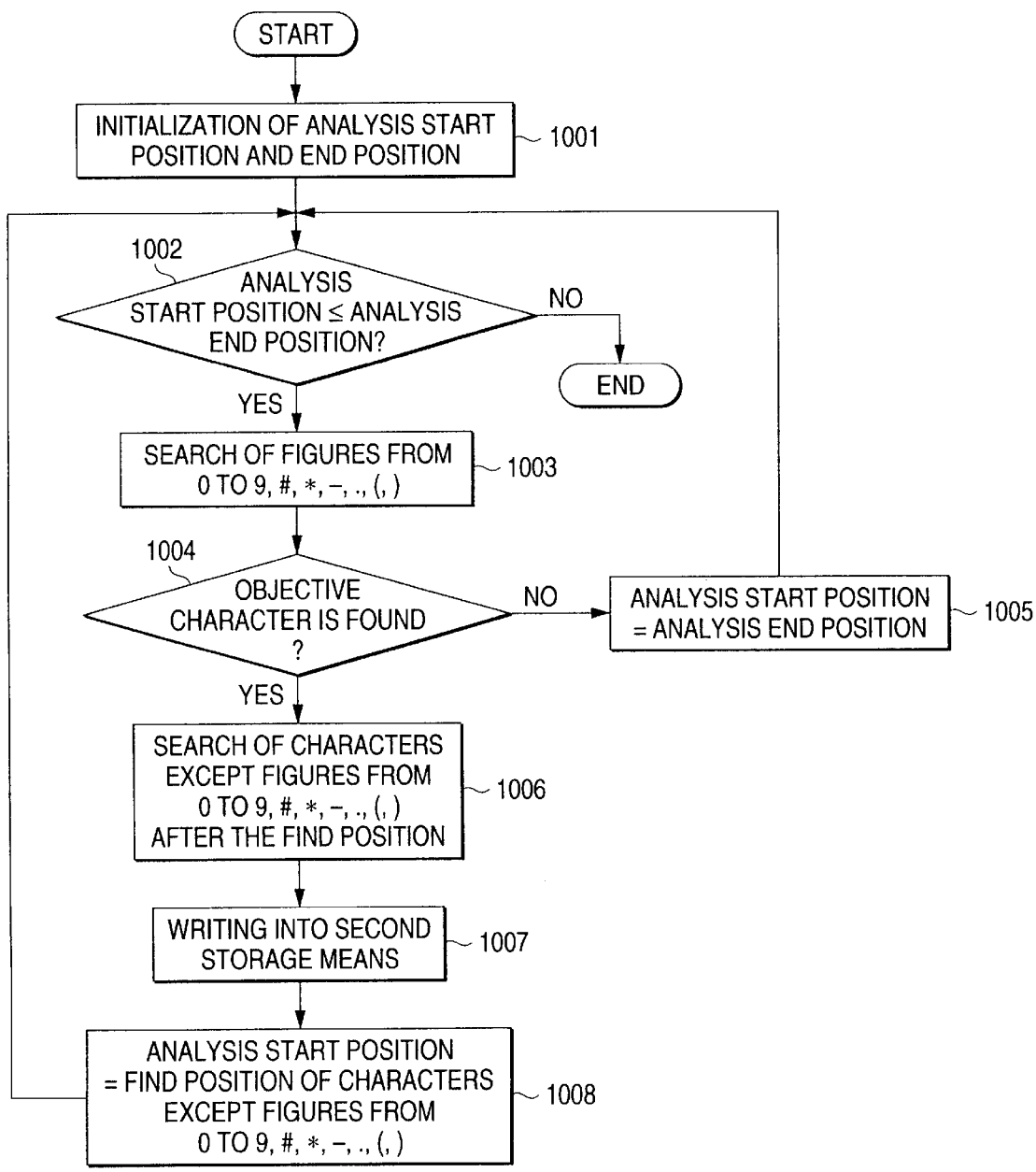
FIG. 10 is an operation flow chart at the time of the most suitable telephone number search in the second embodiment of the present invention.

Next, by using a flow chart in FIG. 10, the search operation of the most suitable telephone number in Step 703, will be described.

Step 1001: the analysis start position and the analysis end position used for carrying out the analysis, are initialized, and the sequence advances to Step 1002.

Step 1002: when the analysis start position is equal or smaller than the analysis end position, the sequence advances to Step 1003, and when it is not so, the sequence ends.

Step 1003: it is searched whether any character from "0" to "9", "#", "*", "-", ".", ",", "(", or ")", exists between a range from the analysis start position to the analysis end position, and the sequence advances to Step 1004.

Step 1004: when the search objective character is found, the sequence advances to Step 1006, and when it is not found, the sequence advances to Step 1005.

Step 1005: the analysis start position is made the analysis end position, and the sequence advances to Step 1002.

Step 1006: a position at which the character except any of characters from "0" to "9", "#", "*", "-", ".", ",", "(", or ")", is found, is searched, after the position at which any of characters from "0" to "9", "#", "*", "-", ".", ",", "(", or ")", is found, and the sequence advances to Step 1007.

Step 1007: the telephone number as the kind, the position at which any of characters from "0" to "9", "#", "*", "-", ".", "," "(", or ")", is found, which is searched in Step 1006, as the start position, the position at which the character except any of characters from "0" to "9", "#", "*", "-", ".", "," "(", or ")", is found, which is searched in Step 1006, −1, as the end position, and the information that it is effective, are stored in the second storage means 503, and the sequence advances to Step 1008.

Step 1008: the analysis start position is made the position at which the character except any of characters from "0" to "9", "#", "*", "-", ".", "," "(", or ")", is found, which is searched in Step 906, and the sequence advances to Step 1002.

Figure 12:
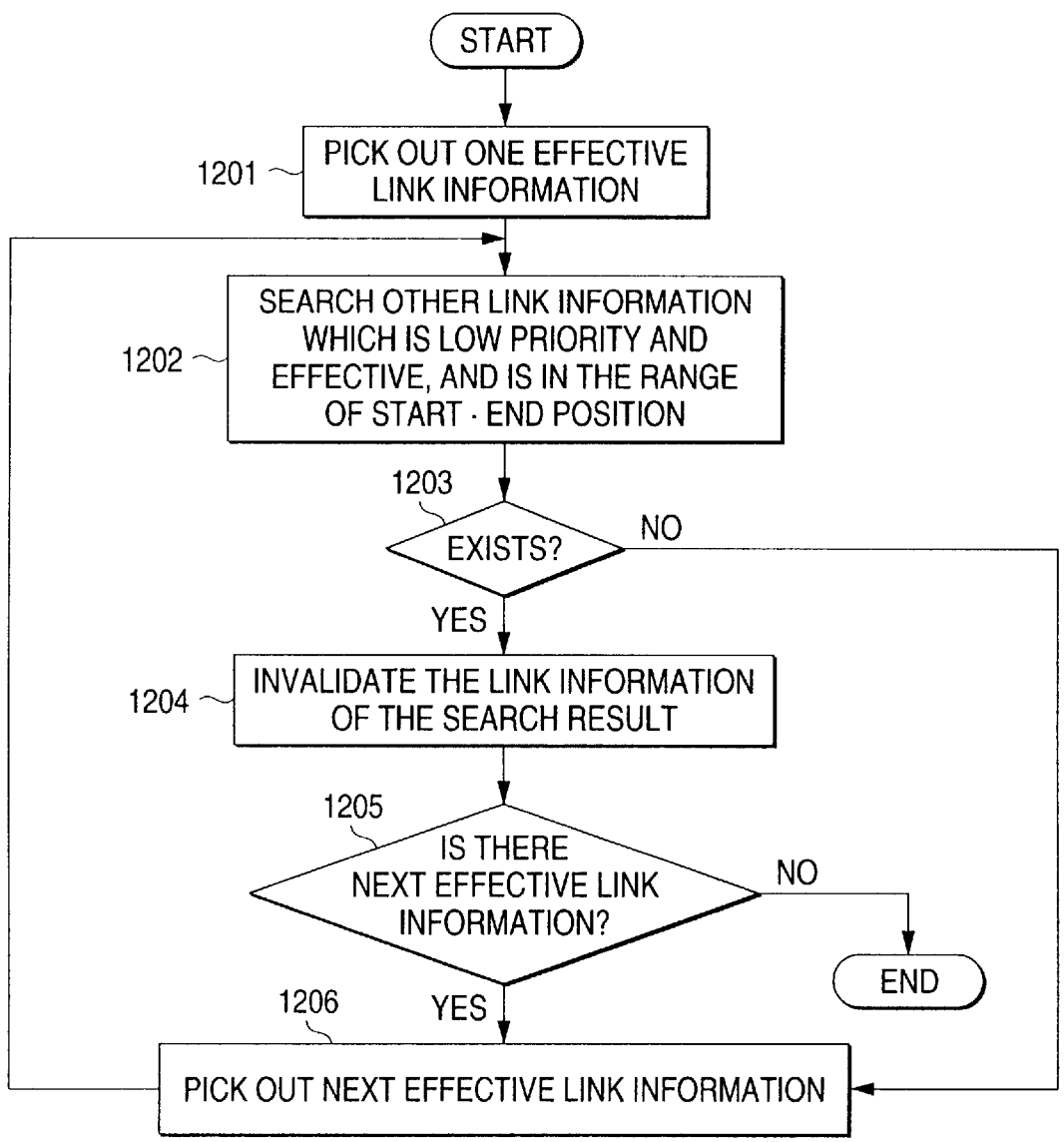
FIG. 12 is an operation flow chart at the time of the link information determination in the second embodiment of the present invention.

Next, by using a flow chart in FIG. 12, the operation by which the link information determination means 504 determines the link information in the document processing apparatus in the present embodiment, will be described.

Step 1201: one effective link information is picked out from the link information stored in the second storage means 503, and the sequence advances to Step 1202.

Step 1202: other than the picked out effective link information, the link information in which the predetermined priority of the kind of the link information is low, and the link information is effective, and which is included in a range between the start position and end position of the picked out link information, is searched, and the sequence advances to Step 1203.

Step 1203: as the result of Step 1202, when the search objective link information exists, the sequence advances to Step 1204, and when it does not exist, the sequence advances to Step 1206.

Step 1204: the search objective link information is changed to ineffective, and the sequence advances to Step 1205.

Step 1205: when the effective link information exists next to the picked out effective link information, the sequence advances to Step 1206, and when it does not exist, the sequence ends.

Step 1206: one of the next effective link information is picked out, and the sequence advances to Step 1202.

Next, the specific operation when the link information is extracted and determined from the received document and displayed, in the document processing apparatus in the present embodiment, will be described. It is defined that the operation advances in the order from the following (1) to (11). Incidentally, it is supposed that the document shown in FIG. 6 is received as the receiving document. Because the description of FIG. 6 is the same as the above description, it is neglected.

Further, as the priority to determine the link information of the link information determination means 504, it is supposed that the electronic mail address information is the highest, next, the hyper link information, and the telephone number information is the lowest priority.

(1) The text document shown in FIG. 6 is received by the receiving means 501, and stored in the first storage means.

(2) The link information extraction means 502 obtains the text document stored in the first storage means 105.

(3) The link information extraction means 502 initially carries out the search of the most suitable hyper link. As the search result, the content that the kind of the link information is the hyper link, the start position is the 21-th bytes of the whole document, the end position is the 44-th bytes of the whole document, and the link information is effective, is obtained. The information is stored in the second storage means 503 (refer to the line 1101 in FIG. 11).

(4) The link information extraction means 502 searches the most suitable electronic mail address next. As the search result, the content that the kind of the link information is the electronic mail, the start position is the 71-th bytes of the whole document, the end position is the 88-th bytes of the whole document, and the link information is effective, is obtained. This information is stored in the second information storage means 503 (refer to the line 1102 in FIG. 11).

(5) The link information extraction means 502 searches the most suitable telephone number next. As the search result, the content that the kind of the link information is the telephone number, the start position is the 32-th bytes of the whole document, the end position is the 40-th bytes of the whole document, and the link information is effective, and the kind of the link information is the telephone number, the start position is the 73-th bytes of the whole document, the end position is the 80-th bytes of the whole document, and the link information is effective, and the kind of the link information is the telephone number, the start position is the 117-th bytes of the whole document, the end position is the 126-th bytes of the whole document, and the link information is effective, is obtained. This information is stored in the second information storage means 503 (refer to the line 1103, the line 1104, and the line 1105 in FIG. 11).

(6) The link information determination means 504 determines the most suitable link according to the predetermined priority in the order of the hyper link, electronic mail, and telephone number.

Figures 13, 14:
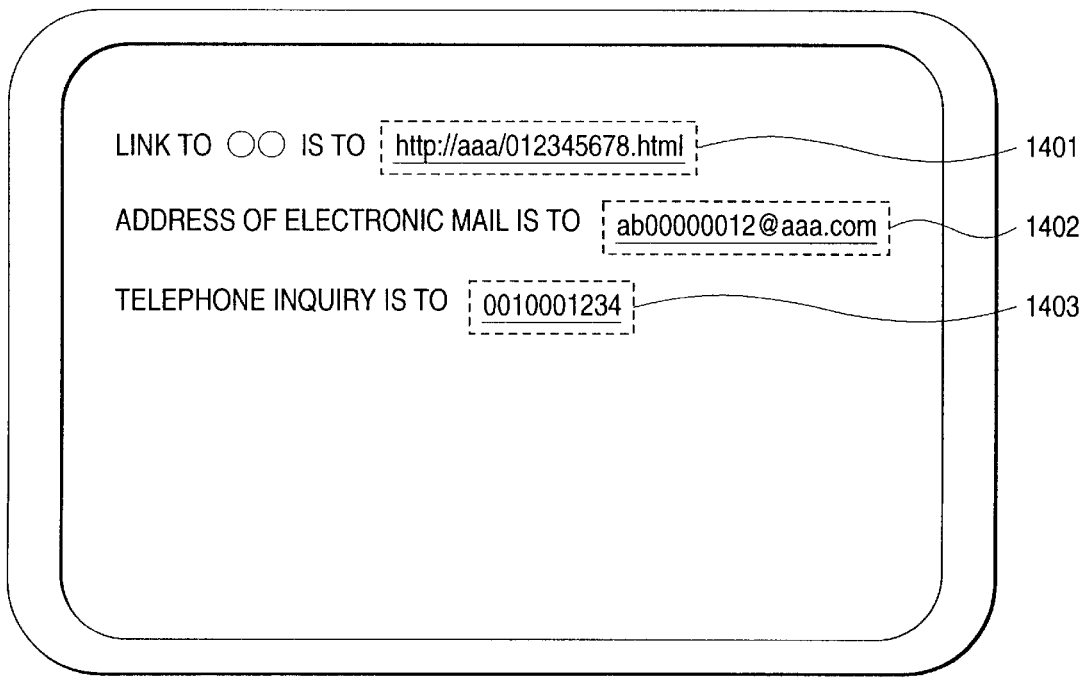
FIG. 13 is a conceptual view of the link information stored in the second storage means after the link information determination in the second embodiment of the present invention.
FIG. 14 is an example of a display in the second embodiment of the present invention.

(7) In the determination processing of the most suitable link shown in the line 1101, because the line 1103 is included in the start position and the end position of the most suitable hyper link, it is stored in the second storage means 503 as an ineffective link (refer to the area 1301 in FIG. 13)

(8) In the determination processing of the most suitable link shown in the line 1102, because the line 1104 is included in the start position and the end position of the most suitable electronic mail, it is stored in the second storage means 503 as an ineffective one (refer to the area 1302 in FIG. 13).

(9) Because the line 1103 and line 1104 are ineffective link information, these are skipped.

(10) In the determination processing of the most suitable link in the line 1105, the line 1105 remains as it is as an effective link.

(11) The display means 505 generates the display data from the effective link information stored in the second storage means 503, and the received document stored in the first storage means, and outputs to the liquid crystal display 103 as shown in FIG. 14. When the display data is generated, the under line is provided to the area including the link information, and the display data by which the area not including the link information can be distinguished, is generated. As the result, in FIG. 14, the area 1401 is the hyper link information, the area 1402 is the electronic address information, and the area 1403 is the telephone number information.

As described above, according to the present embodiment, when the telephone number information and the link information except the telephone number information mixedly exist in the document, by determining the link information in the predetermined priority so that the link information is not duplicated, a time that the user confirms whether it is right as the telephone number information, can be decreased.

Incidentally, in the present embodiment, as the link information, the hyper link, electronic mail, and the telephone number are used, however, any one of descriptions which show the link to the other, may be allowable.

Further, in the link information determination means 504, as the priority to determine the link information, the electronic mail is the highest, however, the hyper link may be the highest.

Further, in the present embodiment, the link determination is carried out after each of the hyper link information, electronic mail address information, and the telephone number is searched, however, in the predetermined priority, the link information is searched, and simultaneously, the most suitable link may be determined. For example, in the present embodiment, after the electronic mail address is searched and the most suitable link is determined, the hyper link is searched and the most suitable link is determined to a portion which is not determined as the link information of the electronic mail address, and after that, the telephone number is searched and the most suitable link may be determined to a portion in which both of the electronic mail address and the hyper link are not determined.

Further, in the present embodiment, the displayed link information is selected, and when the link information as the selected result is the telephone number information, the transmission operation may be automatically carried out.

Industrial Applicability

As described above, according to the present invention, in the case where the link information can be described as the additional information which is not actually displayed like as the HTML, when the telephone number is described in the link information which is described as the additional information, the transmission operation can be automatically carried out at the time of the link selection, therefore, the effect that the facility is increased for the user without carrying out a useless operation, can be obtained. Further, in the case where the telephone number information and the link information except the telephone number information are mixedly described in the received document, when the telephone number information and the link information except the telephone number information are extracted so that these are not duplicated, the effect is obtained in which the misconception at the time of extraction of the telephone number is eliminated, and a time that the user confirms every time whether it is proper as the telephone number, is decreased.

What is claimed is:

1. A document processing apparatus, comprising: a receiving means for receiving a document including a telephone number information and at least one link information different from the telephone number information in the document content; a link information extraction means for extracting the telephone number information and the link information different from the telephone number information from the document received by said receiving means, wherein said link information extraction means extracts the telephone number information and the link information different from the telephone number information in a predetermined priority; a display means for displaying the document based on the link information extracted by said link information extraction means; a selection means for selecting the link information in the document; and a link operation control means which carries out a transmission operation when the link information selected by said selection means is a telephone number, wherein said transmission operation is to another party shown by the telephone number.

2. A document processing apparatus, comprising:

a receiving means for receiving a document including telephone number information and at least one link information different from the telephone number information in the document content; and a link information extraction means for extracting the telephone number information and the link data information different from the telephone number information from the document received by said receiving means, a link information determination means for determining link information link information according to a predetermined priority, when the link information extraction means extracts a same character row as a most suitable link in the document for the telephone number information and the link information different from the telephone number information.

3. The document processing apparatus according to claim 2, further comprising:

a display means for displaying the document based on the link information extracted by said link information extraction means;

a selection means for selecting the link information in the document; and a link operation control means which carries out a transmission operation, when the link information selected by said selection means is a telephone number, wherein said transmission operation is to another party shown by the telephone number.

4. A document processing apparatus, comprising:

a receiving means for receiving a document including telephone number information and at least one link information different from the telephone number information in the document content; and a link information extraction means for extracting the telephone number information and the link data information different from the telephone number information from the document received by said receiving means, wherein the link information extraction means carries out the extraction in a predetermined priority so that extraction results of a most suitable link for the telephone number information and a most suitable link for the link information different from the telephone number information are not duplicated.

5. The document processing apparatus according to claim 4, further comprising:

a display means for displaying the document based on the link information extracted by said link information extraction means;

a selection means for selecting the link information in the document; and a link operation control means which carries out a transmission operation, when the link information selected by said selection means is a telephone number, wherein said transmission operation is to another party shown by the telephone number.

* * * * *